US012743961B2

(12) United States Patent
Smolover

(10) Patent No.: US 12,743,961 B2
(45) Date of Patent: Sep. 22, 2026

(54) ENHANCED E-BOOK PROVIDING REAL-TIME FEEDBACK AND GUIDED CONTENT FOR MUSICAL INSTRUCTION

(71) Applicant: Accelerando, LLC, Litchfield, CT (US)

(72) Inventor: David Simeon Smolover, Lakeside, CT (US)

(73) Assignee: Accelerando, LLC, Litchfield, CT (US)

( * ) Notice: Subject to any disclaimer, the term of this patent is extended or adjusted under 35 U.S.C. 154(b) by 318 days.

(21) Appl. No.: 18/368,342

(22) Filed: Sep. 14, 2023

(65) Prior Publication Data

US 2024/0119853 A1 Apr. 11, 2024

Related U.S. Application Data

(60) Provisional application No. 63/407,253, filed on Sep. 16, 2022.

(51) Int. Cl.

| | |
|---|---|
| ***G09B 5/06*** | (2006.01) |
| ***G09B 15/00*** | (2006.01) |
| ***G10G 1/00*** | (2006.01) |
| ***G10H 1/00*** | (2006.01) |

(52) U.S. Cl.

CPC ............. *G09B 5/065* (2013.01); *G09B 15/00* (2013.01); *G10G 1/00* (2013.01); *G10H 1/0025* (2013.01); *G10H 2210/066* (2013.01); *G10H 2210/071* (2013.01); *G10H 2210/076* (2013.01); *G10H 2210/091* (2013.01); *G10H 2210/111* (2013.01); *G10H 2220/121* (2013.01)

(58) Field of Classification Search

None

See application file for complete search history.

(56) References Cited

U.S. PATENT DOCUMENTS

| | | | | |
|---|---|---|---|---|
| 6,323,411 | B1 * | 11/2001 | Fukata | G09B 15/04 84/478 |
| 6,417,435 | B2 * | 7/2002 | Chantzis | G09B 15/04 84/723 |
| 8,481,838 | B1 * | 7/2013 | Smith | G09B 15/00 84/477 R |
| 9,672,799 | B1 * | 6/2017 | Kim | G10H 1/0008 |
| 9,747,876 | B1 | 8/2017 | Clarke et al. | |
| 10,007,402 | B2 | 6/2018 | Grant | |
| 10,854,180 | B2 * | 12/2020 | Silverstein | G10H 1/0025 |
| 11,037,538 | B2 * | 6/2021 | Estes | G10H 1/38 |

(Continued)

FOREIGN PATENT DOCUMENTS

| | | | | |
|---|---|---|---|---|
| WO | WO-2011002731 | A2 * | 1/2011 | G09B 15/023 |
| WO | WO-2024/059193 | A1 | 3/2024 | |

OTHER PUBLICATIONS

L. Aprameya, "An Autonomous Intelligent Music Teacher," in IEEE Potentials, vol. 37, No. 1, pp. 10-14, Jan.-Feb. 2018, doi: 10.1109/MPOT.2015.2414445 (Year: 2018).*

(Continued)

*Primary Examiner* — Eduardo Castilho

(74) *Attorney, Agent, or Firm* — Choate, Hall & Stewart LLP; William R. Haulbrook; Ronen Adato

(57) ABSTRACT

Presented herein are systems and methods for presenting content of an electronic book to provide real-time feedback to a user performing a musical piece, and to select content for subsequent presentation to the user based at least in part on an automated assessment of user performance of the musical piece.

20 Claims, 7 Drawing Sheets

(56) References Cited

U.S. PATENT DOCUMENTS

| | | | | |
|---|---|---|---|---|
| 2003/0036046 | A1 | 2/2003 | Smolover | |
| 2017/0337838 | A1* | 11/2017 | Elkon | G06F 3/013 |
| 2019/0156696 | A1* | 5/2019 | Charters | G06F 16/637 |
| 2019/0385470 | A1* | 12/2019 | Le Chevalier | G06F 16/9535 |
| 2020/0074876 | A1* | 3/2020 | Jancsy | G10H 1/0008 |
| 2020/0233925 | A1* | 7/2020 | Reyes Ramirez | A61B 5/167 |
| 2020/0251011 | A1* | 8/2020 | Liu | G09B 15/023 |
| 2020/0327821 | A1* | 10/2020 | Holzheimer | G09B 5/00 |
| 2021/0049990 | A1* | 2/2021 | Medeot | G06N 7/01 |
| 2021/0104169 | A1* | 4/2021 | Si | G06T 11/00 |
| 2021/0150927 | A1* | 5/2021 | Monos | G06N 5/04 |
| 2021/0343179 | A1* | 11/2021 | Gan | G06N 3/044 |
| 2022/0172639 | A1* | 6/2022 | Aharonson | H04R 1/406 |
| 2022/0180766 | A1 | 6/2022 | Aharonson et al. | |
| 2023/0245586 | A1* | 8/2023 | Livne | G09B 15/023 434/308 |
| 2023/0343310 | A1* | 10/2023 | Seim | G10G 1/02 |

OTHER PUBLICATIONS

Fiebrink et al. "The Machine Learning Algorithm as Creative Musical Tool," CoRR abs/1611.00379 (Year: 2016).*

P. Seshadri and A. Lerch, "Improving Music Performance Assessment with Contrastive Learning," CoRR, vol. abs/2108.01711 (Year: 2021).*

M. Dorfer, F. Henkel, and G. Widmer, "Learning to Listen, Read, and Follow: Score Following as a Reinforcement Learning Game," CoRR, vol. abs/1807.06391 (Year: 2018).*

Pati et al., "Assessment of Student Music Performances Using Deep Neural Networks," Appl. Sci. 2018, 8, 507. https://doi.org/10.3390/app8040507 (Year: 2018).*

K. Apaydinli, "Intelligent Tutoring Systems in Music Education,", 2020, pp. 3-32, https://www.researchgate.net/publication/348080865_Intelligent_Tutoring_Systems_in_Music_Education (Year: 2020).*

A. Lerch, C. Arthur, K. A. Pati, and S. Gururani, "Music Performance Analysis: A Survey," CoRR, vol. abs/1907.00178 (Year: 2019).*

L. H. Lee, "Musical Score Following and Audio Alignment," arXiv [cs.SD] 2022, https://arxiv.org/abs/2205.03247 (Year: 2022).*

Elowsson, A. et al., Polyphonic pitch tracking with deep layered learning, J. Acoust. Soc. Am., 148(1):446 (2020).

International Search Report for PCT/US2023/032734, filed Sep. 14, 2023, 4 pages, (mailed Dec. 6, 2023).

Kao, K. and Niitsoo, M., MatchMySound: Introducing Feedback to Online Music Education, International Conference on Web-Based Learning: New Horizons in Web-Based Learning, pp. 217-225, (2014).

Kao, K. and Niitsoo, M., Optimizing the interaction between a self-learning guitar student and a sound recognition based educational game, CFMAE: The Changing Face of Music and Art Education Interdisciplinary Journal for Music and Art Pedagogy, 7(1):69-79 (2015).

Matchmysound, Our Technology—MatchMySound—Music Education Technology, 8 pages, (2022).

Written Opinion for PCT/US2023/032734, filed Sep. 14, 2023, 4 pages, (mailed Dec. 6, 2023).

* cited by examiner

ENHANCED E-BOOK PROVIDING REAL-TIME FEEDBACK AND GUIDED CONTENT FOR MUSICAL INSTRUCTION

CROSS REFERENCE TO RELATED APPLICATIONS

This application claims priority to and benefit from U.S. Provisional Application No. 63/407,253, filed Sep. 16, 2022, the content of which is hereby incorporated by reference in its entirety.

BACKGROUND

Current music instruction electronic books (e-books) are simply digital representations of print books. The primary difference between the physical book and the digital book is that the digital book can provide links or embed video and audio. However, these e-books cannot alter the linear nature of their content based upon user performance.

SUMMARY

Described herein are e-books for musical instruction that provide automatically determined assessment of a user performance of a musical piece that is graphically rendered on the e-book reader display. The assessment of user performance is graphically and/or numerically (score) displayed on the e-book reader. The assessment may also provide a text explanation of any error.

The feedback can be algorithmically ascertained by comparing the performance recording created by the user to a reference track stored on the platform. The assessment/feedback can show instances (e.g., each instance) where the user recording differs from the reference track in terms of pitch, rhythm and tempo. In some embodiments, feedback may (e.g., additionally or alternatively) be based on and/or incorporate performance measures of other user's performance on the reference track, for example to provide a user with comparison of their performance in context of a broader community of users (e.g., such as a rank, percentile, quartile, average or above average).

The information gathered allows the publisher of the enhanced e-book to alter the user's path in proceeding through the content of the e-book by adapting the subsequent content to the needs of the user as recognized by their proficiency or lack thereof or indications of specific interest and/or displayed preferred learning style. For example, in certain embodiments, the e-book lets learners go to the next chapter only if they have proven that they have mastered the contents of the previous chapter. In certain embodiments, more challenging content is presented when a user is doing well. Also, in certain embodiments, information about (i) user engagement, (ii) how well a user performs certain styles of music, and/or (iii) how well a user performs certain fundamental musical skills guides content to reinforce and build on those strengths and/or interests.

This automated guidance through the content of the e-book is geared toward each individual learner's pace and/or interests, thereby increasing user engagement, reducing user frustration, and improving results.

In addition to the real-time feedback, the enhanced e-book may also contain other features and multimedia content supported by enhanced e-books such as audio, video, links, and the like.

Thus, presented herein are systems and methods for presenting content of an electronic book to provide real-time feedback to a user performing a musical piece, and to select content for subsequent presentation to the user based at least in part on an automated assessment of user performance of the musical piece.

In one aspect, the invention is directed to a method for presenting content of an interactive electronic book to a user, the method comprising: (a) graphically rendering, by a processor of a computing device, a first page (e.g., a first user-selected page) of the interactive electronic book on a display screen, wherein the first page comprises a graphical representation of a first musical piece; (b) detecting, by the processor, an audio signal corresponding to music performed by a user viewing the first page on the display screen; (c) automatically identifying, by the processor, one or more musical features from the detected audio signal, said one or more musical features selected from (i), (ii), and (iii) as follows: (i) a sequence of pitches, (ii) a rhythm, and (iii) a tempo, and automatically determining, by the processor, where the identified one or more musical features agree with and/or deviate from corresponding reference features of the first musical piece; (d) graphically rendering, by the processor, a visual indicator (e.g., a graphical indicator, a numeric score, and/or text) on the display screen of the determined agreement with and/or deviation from the reference features of the first musical piece in near real-time as the user performs; (e) determining, by the processor, a measure of proficiency based at least in part on the determined agreement with and/or deviation from the reference features of the first musical piece; and (f) automatically identifying, by the processor, content for subsequent display to the user based at least in part on the measure of proficiency.

In certain embodiments, the interactive electronic book comprises digital content in one or more of the following formats: EPUB, MOBI, AZW, AZW3, IBA, PDF, LRS, LRF, LRX, FB2, DJVU, LIT, and RFT.

In certain embodiments, the interactive electronic book comprises embedded media content (e.g., multimedia content) (e.g., images in JPG, JPEG, PNG, and/or GIF format; audio in MP3, MIDI, MID, and/or M4A format; video in MOV, AVI, WMV, and/or MP4 format; and/or files in PDF and/or EPUB format) (e.g., embedded in an iframe).

In certain embodiments, the interactive electronic book comprises non-editable and/or reflowable digital content.

In certain embodiments, the interactive electronic book comprises editable content that is redefined as a new reference.

In certain embodiments, the interactive electronic book is a multimedia enhanced e-book (e.g., an electronic book with embedded images, audio, video, and/or document files).

In certain embodiments, the first page comprises a graphical representation of one of more of the following: (i) one or more measures of sheet music, each measure comprising a series of musical notes and rests depicted on treble and/or bass clefs, (ii) a time signature, (iii) a key signature, (iv) one or more tempo markings, (v) one or more dynamic markings, (vi) one or more accidentals, and (vii) tablature musical notation.

In certain embodiments, graphically rendering the first page comprises rendering a representation of the first page sized to fit on the display screen according to the dimensions of the display screen.

In certain embodiments, the detected audio signal corresponds to vocal and/or instrumental music.

In certain embodiments, step (c) comprises automatically comparing the automatically identified pitch and/or rhythm and/or tempo at least every 0.1 sec, e.g., at least every 0.07 sec, e.g., at least every 0.05 sec, e.g., at least every 0.04 sec, e.g., at least every 0.03 sec, e.g., about every 1/43 sec (0.023 sec).

In certain embodiments, step (c) comprises automated monophonic pitch tracking (e.g., voice, flute, trumpet, saxophone, violin, etc.) and automatic identification of deviation of the detected monophonic pitch from reference monophonic pitch.

In certain embodiments, step (c) comprises automated polyphonic pitch tracking (e.g., piano, organ, guitar, multiple voices, multiple instruments) and automatic identification of deviation of the detected polyphonic pitch from reference polyphonic pitch.

In certain embodiments, the content for subsequent display is a second page of the interactive electronic book comprising a graphical representation of a second musical piece intended to be performed by the user after mastering the first musical piece.

In certain embodiments, the content for subsequent display is a second page of the interactive electronic book comprising a graphical representation of a second musical piece intended to reinforce correction of an error made by the user when performing the first musical piece.

In certain embodiments, the content for subsequent display is a second page of the interactive electronic book comprising a graphical representation of a second musical piece intended for subsequent study following adequate mastery of the first musical piece.

In certain embodiments, the content for subsequent display comprises video and/or audio content intended as instruction to address an error made by the user when performing the first musical piece.

In certain embodiments, the content for subsequent display comprises a menu for selection by the user, said menu presenting options and/or recommendations of content for the user based at least in part on the measure of proficiency of user performance of the first musical piece.

In certain embodiments, step (f) comprises using a machine learning module (e.g., to select and/or generate the content for subsequent display).

In certain embodiments, automatically identifying content in step (f) comprises generating, using a machine learning module (e.g., a generative machine learning module) at least a portion of the content for subsequent display {e.g., generating musical content using a machine learning module [e.g., wherein the machine learning module is/has been trained using a corpus of musical pieces encoded in text using a musical notation system (e.g., ABC notation and/or another text-based notation system); e.g., wherein the machine learning module generates, as output, a string of text encoding a musical piece (e.g., via a text-based musical notation system)] and/or generating explanatory content using a machine learning module [e.g., wherein the machine learning module is a language model trained using written text; e.g., wherein the machine learning module generates, as output, one or more strings of text, each an (e.g., alternative) explanation of a particular content area, skill, etc.)]}.

In another aspect, the invention is directed to a system for presenting content of an interactive electronic book to a user, the system comprising: a processor of a computing device; and a memory having instructions stored thereon, wherein the instructions, when executed by the processor, cause the processor to: (a) graphically render a first page (e.g., a first user-selected page) of the interactive electronic book on a display screen, wherein the first page comprises a graphical representation of a first musical piece; (b) detect an audio signal corresponding to music performed by a user viewing the first page on the display screen; (c) automatically identify one or more musical features from the detected audio signal, said one or more musical features selected from (i), (ii), and (iii) as follows: (i) a sequence of pitches, (ii) a rhythm, and (iii) a tempo, and automatically determining, by the processor, where the identified one or more musical features agree with and/or deviate from corresponding reference features of the first musical piece; (d) graphically render a visual indicator (e.g., a graphical indicator, a numeric score, and/or text) on the display screen of the determined agreement with and/or deviation from the reference features of the first musical piece in near real-time as the user performs; (e) determine a measure of proficiency based at least in part on the determined agreement with and/or deviation from the reference features of the first musical piece; and (f) automatically identify content for subsequent display to the user based at least in part on the measure of proficiency.

In certain embodiments, the system comprises an electronic reader (e.g., e-reader) capable of multimedia presentation (e.g., display of images, video and/or playing of audio content).

In certain embodiments, the electronic reader is capable of detecting the audio signal.

In certain embodiments, the interactive electronic book comprises digital content in one or more of the following formats: EPUB, MOBI, AZW, AZW3, IBA, PDF, LRS, LRF, LRX, FB2, DJVU, LIT, and RFT.

In certain embodiments, the interactive electronic book comprises embedded media content (e.g., multimedia content) (e.g., images in JPG, JPEG, PNG, and/or GIF format; audio in MP3, MIDI, MID, and/or M4A format; video in MOV, AVI, WMV, and/or MP4 format; and/or files in PDF and/or EPUB format) (e.g., embedded in an iframe).

In certain embodiments, the interactive electronic book comprises non-editable and/or reflowable digital content.

In certain embodiments, the interactive electronic book comprises editable content that is redefined as a new reference.

In certain embodiments, the interactive electronic book is a multimedia enhanced e-book (e.g., an electronic book with embedded images, audio, video, and/or document files).

In certain embodiments, the first page comprises a graphical representation of one of more of the following: (i) one or more measures of sheet music, each measure comprising a series of musical notes and rests depicted on treble and/or bass clefs, (ii) a time signature, (iii) a key signature, (iv) one or more tempo markings, (v) one or more dynamic markings, (vi) one or more accidentals, and (vii) tablature musical notation.

In certain embodiments, the instructions cause the processor to graphically render a representation of the first page sized to fit on the display screen according to the dimensions of the display screen.

In certain embodiments, the detected audio signal corresponds to vocal and/or instrumental music.

In certain embodiments, the instructions cause the processor to automatically compare the identified pitch and/or rhythm and/or tempo at least every 0.1 sec, e.g., at least every 0.07 sec, e.g., at least every 0.05 sec, e.g., at least every 0.04 sec, e.g., at least every 0.03 sec, e.g., about every 1/43 sec (0.023 sec).

In certain embodiments, the instructions cause the processor to perform automated monophonic pitch tracking (e.g., voice, flute, trumpet, saxophone, violin, etc.) and automatic identification of deviation of the detected monophonic pitch from reference monophonic pitch.

In certain embodiments, the instructions cause the processor to perform automated polyphonic pitch tracking (e.g., piano, organ, guitar, multiple voices, multiple instruments) and automatic identification of deviation of the detected polyphonic pitch from reference polyphonic pitch.

In certain embodiments, the content for subsequent display is a second page of the interactive electronic book comprising a graphical representation of a second musical piece intended to be performed by the user after mastering the first musical piece.

In certain embodiments, the content for subsequent display is a second page of the interactive electronic book comprising a graphical representation of a second musical piece intended to reinforce correction of an error made by the user when performing the first musical piece.

In certain embodiments, the content for subsequent display is a second page of the interactive electronic book comprising a graphical representation of a second musical piece intended for subsequent study following adequate mastery of the first musical piece.

In certain embodiments, the content for subsequent display comprises video and/or audio content intended as instruction to address an error made by the user when performing the first musical piece.

In certain embodiments, the content for subsequent display comprises a menu for selection by the user, said menu presenting options and/or recommendations of content for the user based at least in part on the measure of proficiency of user performance of the first musical piece.

In certain embodiments, at step (f), the instructions cause the processor to automatically identify content for subsequent display using a machine learning module (e.g., to select and/or generate the content for subsequent display).

In certain embodiments, at step (f), the instructions cause the processor to automatically identify content for subsequent display by generating, using a machine learning module (e.g., a generative machine learning module) at least a portion of the content for subsequent display {e.g., generating musical content using a machine learning module [e.g., wherein the machine learning module is/has been trained using a corpus of musical pieces encoded in text using a musical notation system (e.g., ABC notation and/or another text-based notation system); e.g., wherein the machine learning module generates, as output, a string of text encoding a musical piece (e.g., via a text-based musical notation system)] and/or generating explanatory content using a machine learning module [e.g., wherein the machine learning module is a language model trained using written text; e.g., wherein the machine learning module generates, as output, one or more strings of text, each an (e.g., alternative) explanation of a particular content area, skill, etc.)]}.

In another aspect, the invention is directed to a method for automatically generating one or more tailored content elements (e.g., a musical piece and/or explanatory content) customized to an individual user of an interactive electronic book, the method comprising: (a) receiving, by a processor of a computing device, one or more measures of proficiency evaluating performance of the individual user on one or more musical pieces (e.g., each measure of proficiency associated with and evaluating a particular performance of a particular musical piece by the user); (b) automatically generating, by the processor, using one or more machine learning module(s), the one or more tailored content elements based on the one or more measures of proficiency; and (c) storing and/or providing, by the processor, the one or more tailored content elements, for display to and/or access by the individual user [e.g., causing upload of the one or more tailored content elements to an account (e.g., of a cloud-based platform) associated with, and accessible to (e.g., for download) the individual user; e.g., causing generation and/or transmission of a notification of new content to the individual user (e.g., push notification, SMS, email, etc.); e.g., causing an update to the interactive electronic book to incorporate (e.g., graphically render, for display to the individual user, e.g., via new pages and/or menu options) the one or more tailored content elements].

In certain embodiments the computing device is a server of a cloud-based system.

In certain embodiments, the method comprises: receiving, by the processor, an audio signal corresponding to (e.g., representing) a first performance of the individual user on a first musical piece of the one or more musical pieces; automatically identifying, by the processor, one or more musical features from the received audio signal, said one or more musical features selected from (i), (ii), and (iii) as follows: (i) a sequence of pitches, (ii) a rhythm, and (iii) a tempo, and automatically determining, by the processor, where the identified one or more musical features agree with and/or deviate from corresponding reference features of the first musical piece; and determining, by the processor, the one or more measures of proficiency based at least in part on the determined agreement with and/or deviation from the reference features of the first musical piece.

In certain embodiments, the one or more tailored content elements comprise a generated musical piece.

In certain embodiments, the one or more machine learning modules comprise a first machine learning module that receives, as input, at least a portion of the one or more measures of proficiency, and generates, as output, a musical notation string comprising a plurality of characters (e.g., a text string) representing the generated musical piece.

In certain embodiments, the one or more tailored content elements comprise a generated explanatory content element.

In certain embodiments, the one or more machine learning modules comprise a second machine learning module that receives, as input, at least a portion of the one or more measures of proficiency, and generates, as output, one or more text strings, each providing a human language (e.g., English, Spanish, French, Chinese, etc.) explanation of a particular content area (e.g., musical skill, concept, etc.).

In another aspect, the invention is directed to a system for automatically generating one or more tailored content elements (e.g., a musical piece and/or explanatory content) customized to an individual user of an interactive electronic book, the system comprising: a processor of a computing device; and memory having instructions stored thereon, wherein the instructions, when executed by the processor, cause the processor to: (a) receive one or more measures of proficiency evaluating performance of the individual user on one or more musical pieces (e.g., each measure of proficiency associated with and evaluating a particular performance of a particular musical piece by the user); (b) automatically generate, using one or more machine learning module(s), the one or more tailored content elements based on the one or more measures of proficiency; and (c) store and/or provide the one or more tailored content elements, for display to and/or access by the individual user [e.g., causing upload of the one or more tailored content elements to an account (e.g., of a cloud-based platform) associated with, and accessible to (e.g., for download) the individual user; e.g., causing generation and/or transmission of a notification of new content to the individual user (e.g., push notification, SMS, email, etc.); e.g., causing an update to the interactive electronic book to incorporate (e.g., graphically render, for display to the individual user, e.g., via new pages and/or menu options) the one or more tailored content elements].

In certain embodiments, the system is a cloud-based system (e.g., wherein the computing device is a server of a cloud-based system).

In certain embodiments, the instructions cause the processor to: receive an audio signal corresponding to (e.g., representing) a first performance of the individual user on a first musical piece of the one or more musical pieces; automatically identify one or more musical features from the received audio signal, said one or more musical features selected from (i), (ii), and (iii) as follows: (i) a sequence of pitches, (ii) a rhythm, and (iii) a tempo, and automatically determine where the identified one or more musical features agree with and/or deviate from corresponding reference features of the first musical piece; and determine the one or more measures of proficiency based at least in part on the determined agreement with and/or deviation from the reference features of the first musical piece.

In certain embodiments, the one or more tailored content elements comprise a generated musical piece.

In certain embodiments, the one or more machine learning modules comprise a first machine learning module that receives, as input, at least a portion of the one or more measures of proficiency, and generates, as output, a musical notation string comprising a plurality of characters (e.g., a text string) representing the generated musical piece.

In certain embodiments, the one or more tailored content elements comprise a generated explanatory content element.

In certain embodiments, the one or more machine learning modules comprise a second machine learning module that receives, as input, at least a portion of the one or more measures of proficiency, and generates, as output, one or more text strings, each providing a human language (e.g., English, Spanish, French, Chinese, etc.) explanation of a particular content area (e.g., musical skill, concept, etc.).

Features of embodiments described with respect to one aspect of the invention may be applied with respect to another aspect of the invention.

BRIEF DESCRIPTION OF THE DRAWINGS

The foregoing and other objects, aspects, features, and advantages of the present disclosure will become more apparent and better understood by referring to the following description taken in conjunction with the accompanying drawings, in which.

Figure 1:
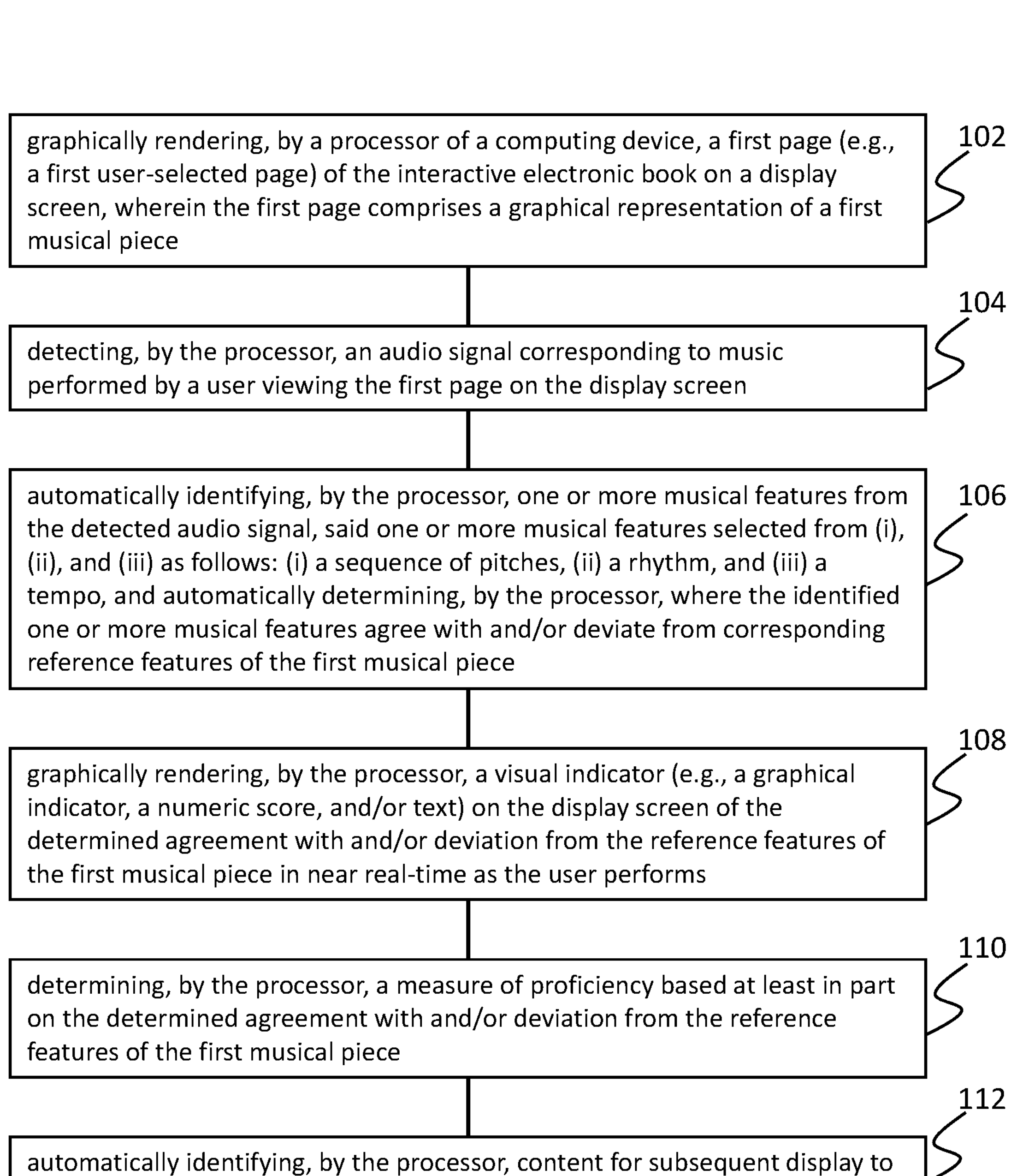
FIG. 1 is a block flow diagram of an illustrative method for presenting content of an interactive electronic book to a user, according to an illustrative embodiment.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

It is contemplated that systems, architectures, devices, methods, and processes of the claimed invention encompass variations and adaptations developed using information from the embodiments described herein. Adaptation and/or modification of the systems, architectures, devices, methods, and processes described herein may be performed, as contemplated by this description.

Throughout the description, where articles, devices, systems, and architectures are described as having, including, or comprising specific components, or where processes and methods are described as having, including, or comprising specific steps, it is contemplated that, additionally, there are articles, devices, systems, and architectures of the present invention that consist essentially of, or consist of, the recited components, and that there are processes and methods according to the present invention that consist essentially of, or consist of, the recited processing steps.

It should be understood that the order of steps or order for performing certain action is immaterial so long as the invention remains operable. Moreover, two or more steps or actions may be conducted simultaneously.

The mention herein of any publication and/or the presentation of information in the Background section is not an admission that the publication or the information serves as prior art with respect to any of the claims presented herein.

Documents referenced herein are incorporated herein by reference. Where there is any discrepancy in the meaning of a particular term, the meaning provided in the Detailed Description section is controlling.

Headers are provided for the convenience of the reader—the presence and/or placement of a header is not intended to limit the scope of the subject matter described herein.

Described herein are music e-books that provide automatically determined assessment of a user performance of a musical piece depicted on the e-book. The feedback is graphically and/or numerically (score) displayed. The assessment may also provide a text explanation of any error.

The feedback is algorithmically ascertained by comparing the performance recording created by the user to a reference track stored on the platform. The assessment/feedback show every instance where the user recording differs from the reference track in terms of pitch, rhythm and tempo. In certain embodiments, the comparison occurs at least every 0.1 sec, e.g., at least every 0.07 sec, e.g., at least every 0.05 sec, e.g., at least every 0.04 sec, e.g., at least every 0.03 sec, e.g., about every 1/43 sec (0.023 sec).

The information gathered allows the publisher of the enhanced e-book to alter the user's path in proceeding through the content of the e-book by adapting the subsequent content to the needs of the user as recognized by their proficiency or lack thereof or indications of specific interest or displayed preferred learning style. For example, in certain embodiments, the e-book lets learners go to the next chapter only if they have proven that they have mastered the contents of the previous chapter. This provides guidance of the learner's pace in proceeding through the content of the e-book, thereby increasing user engagement, reducing user frustration, and improving results. In addition to the real-time feedback, the enhanced e-book may also contain other features and multimedia content supported by enhanced e-books such as audio, video, links, and the like.

Music learners who perform sheet music often cannot recognize where they have made an error in their performance, or they may recognize they have made an error, but they cannot accurately identify the error and/or they may not know how to correct the error. By recognizing the strengths and weaknesses of the music learner, the e-books described herein can tailor content to the needs of each individual user. The e-books are also able to create new learning paths and suggest them to the user.

Self-learners who study a musical instrument from a book, whether a regular book or electronic book, often (i) attempt to progress through the book too fast, and/or (ii) give up too soon. For example, it is thought average self-learners progress through about one third of a book then quit. Providing the automatic feedback described herein allows regulation of the learning pace and customization of the pace to each individual user. Publishers do not normally receive information about how their content is being used or how it performs. An interactive e-book may provide publishers with useful information to make better books. A user's utilization of certain elements of the e-book may also provide information about the user's preferred learning style. This may allow use of the feedback to provide future content in a manner consistent with the user's preferred style of learning, allowing for the automated presentation of future purchase options to the user customized according to the detected aspects of the user's performance/use of the e-book.

Table 1 shows an example of how a user's learning path through the content of an e-book can be automatically guided/altered with methods and systems described herein. In this example, a passing numeric grade (in this case, a score of 70) opens the next chapter of the e-book. The variant paths include increasingly easier exercises on the same subject or for the same skill. The variant paths may also provide different approaches to the same subject or for the same skill, to try different approaches for the user. Additional content is delivered to the user in additional variants for a given chapter until the user reaches the required (in this case, a score of 70 or higher).

TABLE 1

Example of Alteration of user's learning path based on lack of progress

| | Published Path | 1$^{st}$ variant | 2$^{nd}$ variant | 3$^{rd}$ variant | 4$^{th}$ variant |
|---|---|---|---|---|---|
| Chapter 10 | | | | | |
| Chapter 9 | | | | | 85 |
| Chapter 8 | | | | | 88 |
| Chapter 7 | | | | | 87 |
| Chapter 6 | | 50 | 55 | 69 | 81 |
| Chapter 5 | 65 | 78 | | | |
| Chapter 4 | 71 | | | | |
| Chapter 3 | 78 | | | | |
| Chapter 2 | 88 | | | | |
| Chapter 1 | 90 | | | | |

In the above example, the user performed adequately in each chapter from Chapter 1 through 4, then the user received a sub-70 score in Chapter 5, prompting the system to present Chapter 5 in a different way (1' variant) until an adequate score was achieved. In this case, the user achieved a passing score on the 1*s* t variant, but then received a sub-70 score for Chapter 6. Repeated variants of Chapter 6 were needed for the user to achieve a score above 70 (2*n* d variant, 3$^{rd}$ variant, and 4$^{th}$ variant).

Table 2 shows another example of how a user's learning path through the content of an e-book can be automatically guided/altered with methods and systems described herein. In this example, a passing numeric grade (in this case, a score of 70) opens the next chapter of the e-book. The variant paths include increasingly more challenging exercises on the same subject or for the same skill. The variant paths may also provide different approaches to the same subject or for the same skill, to try different, more challenging approaches for the user. Additional content is delivered to the user in additional variants for a given chapter when a user achieves a high enough score to trigger the variant.

TABLE 2

Example of Alteration of user's learning path based on exceptional performance

| | Published Path | 1$^{st}$ variant | 2$^{nd}$ variant | 3$^{rd}$ variant | 4$^{th}$ variant |
|---|---|---|---|---|---|
| Chapter 10 | | | | | |
| Chapter 9 | | | 93 | | |
| Chapter 8 | | 94 | 91 | | |
| Chapter 7 | | 95 | | | |
| Chapter 6 | | 84 | | | |
| Chapter 5 | 90 | 88 | | | |
| Chapter 4 | 94 | | | | |
| Chapter 3 | 92 | | | | |
| Chapter 2 | 88 | | | | |
| Chapter 1 | 90 | | | | |

Table 3 shows another example of how a user's learning path through the content of an e-book can be automatically guided/altered with methods and systems described herein. In this example, a passing numeric grade (in this case, a score of 70) opens the next chapter of the e-book, and variant paths are provided as the system learns more about the user's preferred learning style.

TABLE 3

| Example of Alteration of learning path based on user's preferred learning style | | | | |
|---|---|---|---|---|
| | Published Path (combination of media) | If the machine learning identifies higher scores based upon interaction with text | If the machine learning identifies higher scores based upon interaction with audio | If the machine learning identifies higher scores based upon interaction with video |
| Chapter 10 | | | | |
| Chapter 9 | | | | 89 |
| Chapter 8 | | | | 95 |
| Chapter 7 | | | | 94 |
| Chapter 6 | | | | 88 |
| Chapter 5 | 90 | User moves to new path that relies on video instruction, which matches user's preferred learning style | | |
| Chapter 4 | 94 | | | |
| Chapter 3 | 81 | | | |
| Chapter 2 | 70 | | | |
| Chapter 1 | 70 | | | |

The terms "electronic book", "e-book", and "enhanced e-book" are used interchangeably herein and refer to digital content including text, graphics, video, audio, and/or other digital files, where said content may also include metadata and/or software. In certain embodiments, an e-book is distributed as one or more downloadable files at least a portion of which can be viewed and/or otherwise experienced by a user offline (e.g., without Internet connection). In certain embodiments, an e-book or portions thereof include content (e.g., live Web pages) that must be read online or that is cached for reading offline. In certain embodiments, an e-book is designed for viewing on a variety of display devices, e.g., e-book readers of different sizes and/or manufactured by different companies. In certain embodiments, e-book readers are portable electronic devices designed primarily for the purpose of presenting/displaying digital e-books. In certain embodiments, an e-book reader is a smartphone, a portable computer, a desktop computer, or other computing device with a display and/or audio feedback. In certain embodiments, the e-book reader is capable of detecting an audio signal and transmitting the audio signal to a processor for processing (e.g., where the processing software is executed by a processor remote from the e-book reader). In certain embodiments, the e-book reader is capable of detecting an audio signal and executing software on a processor that is part of the e-book reader device. In certain embodiments, an e-book reader is wireless. In certain embodiments, an e-book reader includes one or more ports for connection to other devices, e.g., for connection of one or more cables, e.g., for direct input of a signal from an electronic instrument (e.g., electric guitar or electric keyboard) and/or for direct output to a processor and/or other device(s). In certain embodiments, the software for processing the digital signal received by the e-book reader is designed to operate without cables, e.g., the reader detects vocal signals and/or non-digital instrumental signals, and/or the software can work with a wide range of signal quality and/or under a variety of real-world conditions (e.g., filtering out background sounds).

In certain embodiments, feedback is rendered for display to the user via the e-book reader, said feedback determined by matching the detected audio output of the user in comparison to a digital reference file. In certain embodiments where a user is playing a MIDI instrument, such as a keyboard with MIDI output, the sound produced by the instrument is detected and compared to a reference file. In other embodiments where a user is playing a MIDI instrument, the MIDI data is compared to the reference file for providing feedback.

FIG. 1 is a block flow diagram of an illustrative method 100 for presenting content of an interactive electronic book to a user, according to an illustrative embodiment. Step 102 is graphically rendering, by a processor of a computing device, a first page (e.g., a first user-selected page) of the interactive electronic book on a display screen, wherein the first page comprises a graphical representation of a first musical piece. Step 104 is detecting, by the processor, an audio signal corresponding to music performed by a user viewing the first page on the display screen. Step 106 is automatically identifying, by the processor, one or more musical features from the detected audio signal, said one or more musical features selected from (i), (ii), and (iii) as follows: (i) a sequence of pitches, (ii) a rhythm, and (iii) a tempo, and automatically determining, by the processor, where the identified one or more musical features agree with and/or deviate from corresponding reference features of the first musical piece. Step 108 is graphically rendering, by the processor, a visual indicator (e.g., a graphical indicator, a numeric score, and/or text) on the display screen of the determined agreement with and/or deviation from the reference features of the first musical piece in near real-time as the user performs. Step 110 is determining, by the processor, a measure of proficiency based at least in part on the determined agreement with and/or deviation from the reference features of the first musical piece. Step 112 is automatically identifying, by the processor, content for subsequent display to the user based at least in part on the measure of proficiency.

In certain embodiments, step 106 involves monophonic and/or polyphonic pitch tracking. Examples of such pitch tracking are described, for example, in (i) Kão, K., Niitsoo, M. (2014), "MatchMySound: Introducing Feedback to Online Music Education" In: Cao, Y., Valjataga, T., Tang, J., Leung, H., Laanpere, M. (eds) New Horizons in Web Based Learning. ICWL 2014. Lecture Notes in Computer Science, vol 8699. Springer, Cham. https://doi.org/10.1007/978-3-319-13296-9_24; and in (ii) Kão, K., Niitsoo, M. (2015), "Optimizing the interaction between a self-learning guitar student and a sound recognition based educational game," CFMAE: The Changing Face of Music and Art Education Interdisciplinary Journal for Music and Art Pedagogy, vol. 7-2015, CFMAE 7/1 MERYC, https://cfmaejournal.wordpress.com/2015/09/01/cfmae-7-1-playful-sounds-personhood/; and in (iii) Elowsson, "Polyphonic pitch tracking with deep layered learning", The Journal of the Acoustical Society of America, Vol. 148, 446 (2020); https://doi.org/10.1121/10.0001468, the texts of which are incorporated herein by reference in their entireties.

Regarding step 112 of the method 100 of FIG. 1, see, for example, Tables 1-3 above for illustrative examples of the kind of guidance provided by step 112 in response to user performance scores on various "Chapters" (e.g., chapters each containing a musical piece or a set of musical pieces). Musical pieces in a chapter or set may be related, e.g., by type, one or more related skills (e.g., particular counting schemes, notes or types of notes (e.g., individual notes, chords), scales, keys, etc.).

Figure 2:
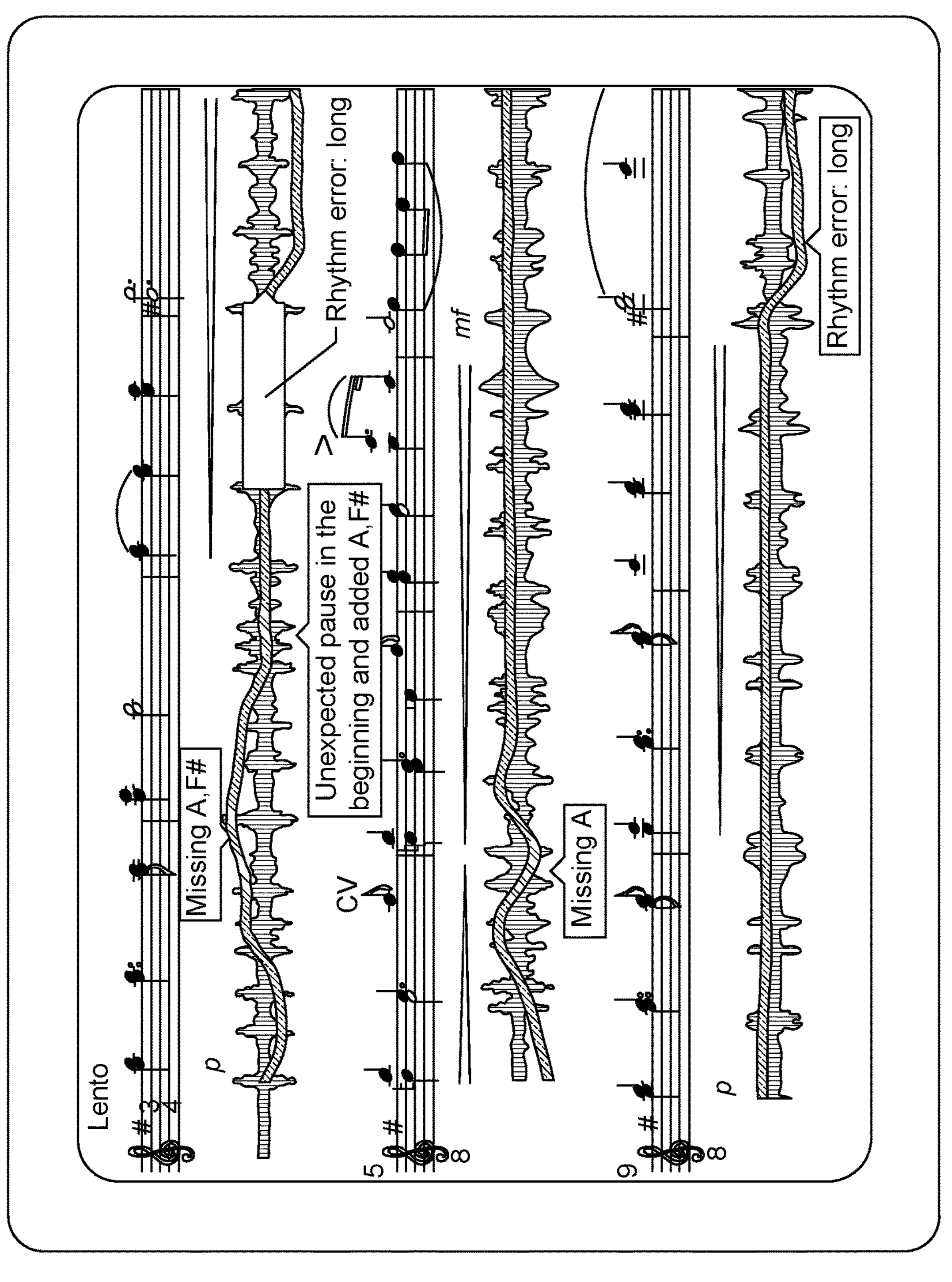
FIG. 2 is a graphical user interface of an electronic book with real-time display of an automated performance assessment with graphical and text feedback indicating where the detected audio signal from the user differs from a reference track in terms of pitch, rhythm, and tempo, according to an illustrative embodiment.

FIG. 2 is a graphical user interface of an electronic book with real-time display 200 of an automated performance assessment with graphical and text feedback indicating where the detected audio signal from the user differs from a reference track in terms of pitch, rhythm, and tempo, according to an illustrative embodiment. The graphical display 200 shows the measures of the musical piece being performed with a graph-style visual feedback (e.g., a tracking line) below the musical notation corresponding to the notes being performed and indicating pitch, rhythm, and/or tempo. Deviations from reference pitch, rhythm, and/or tempo are graphically indicated by color coding of the tracking line according to the extent of deviation (e.g., yellow for minor deviations, red for major deviations). The graphical display 200 also includes textual notation indicating errors at the location along the tracking line that those errors were made. For example, the textual notations in the example in the graphical display 200 shown include a missing A,F #; an unexpected pause in the beginning and added A,F #; a rhythm error (long); a missing A, and another rhythm error (long).

Figure 3:
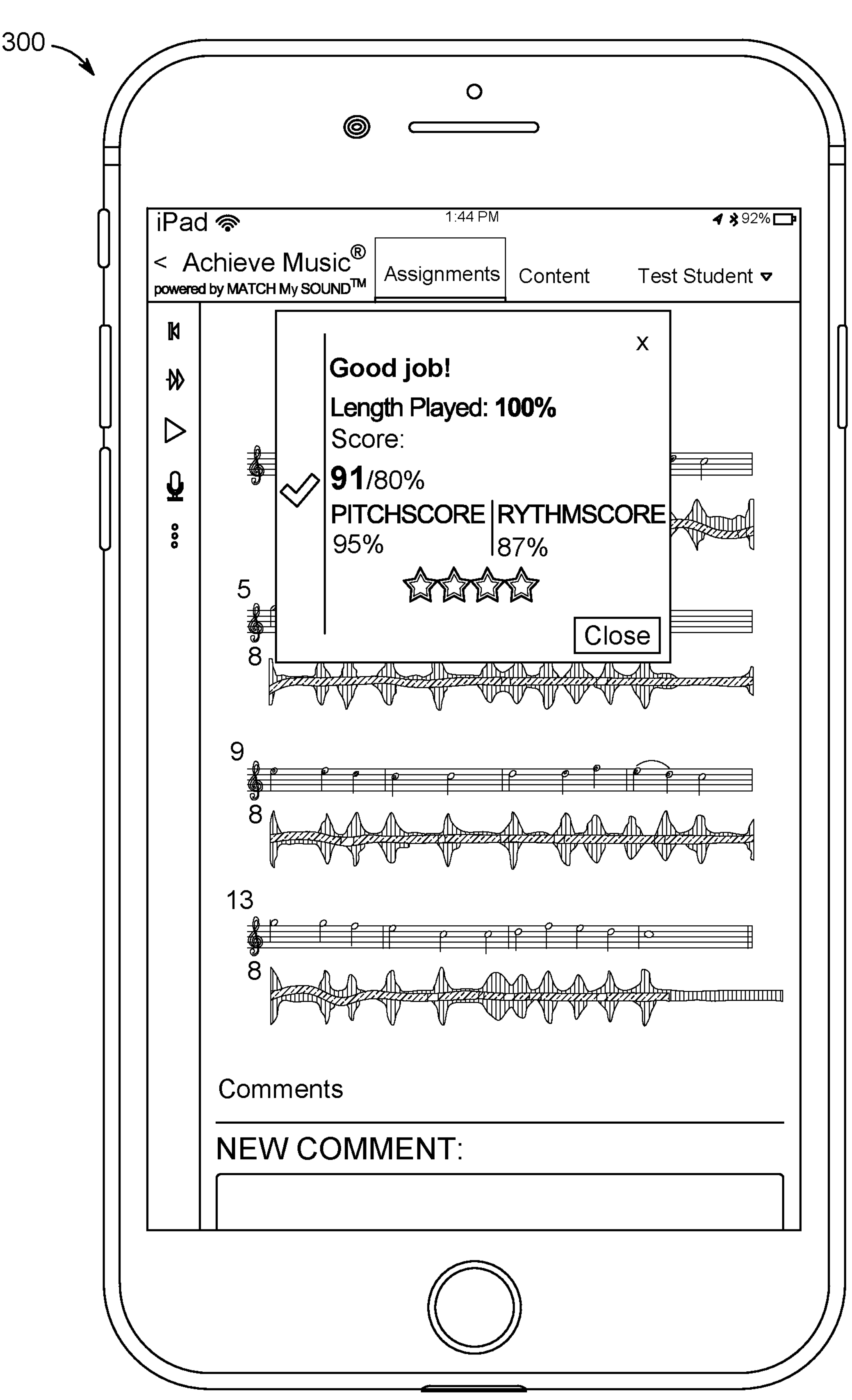
FIG. 3 depicts a smart phone with display showing an illustrative graphical user interface (GUI) of an electronic book (e-book), according to an illustrative embodiment. The illustrative GUI shows a numerical score of an automated assessment of user performance of a musical piece displayed on the electronic book.

FIG. 3 depicts a smart phone with display showing an illustrative graphical user interface (GUI) of an electronic book (e-book), according to an illustrative embodiment. The illustrative GUI shows a numerical score of an automated assessment of user performance of a musical piece displayed on the electronic book. In this example, the numerical score is an overall score based on performance of the musical piece, with graphical tracking line as indicated, pictured here as grayed out to highlight display of the overall score. In this example, the e-book reader is a smart phone, though other e-book readers as disclosed herein may be used.

Figure 4:
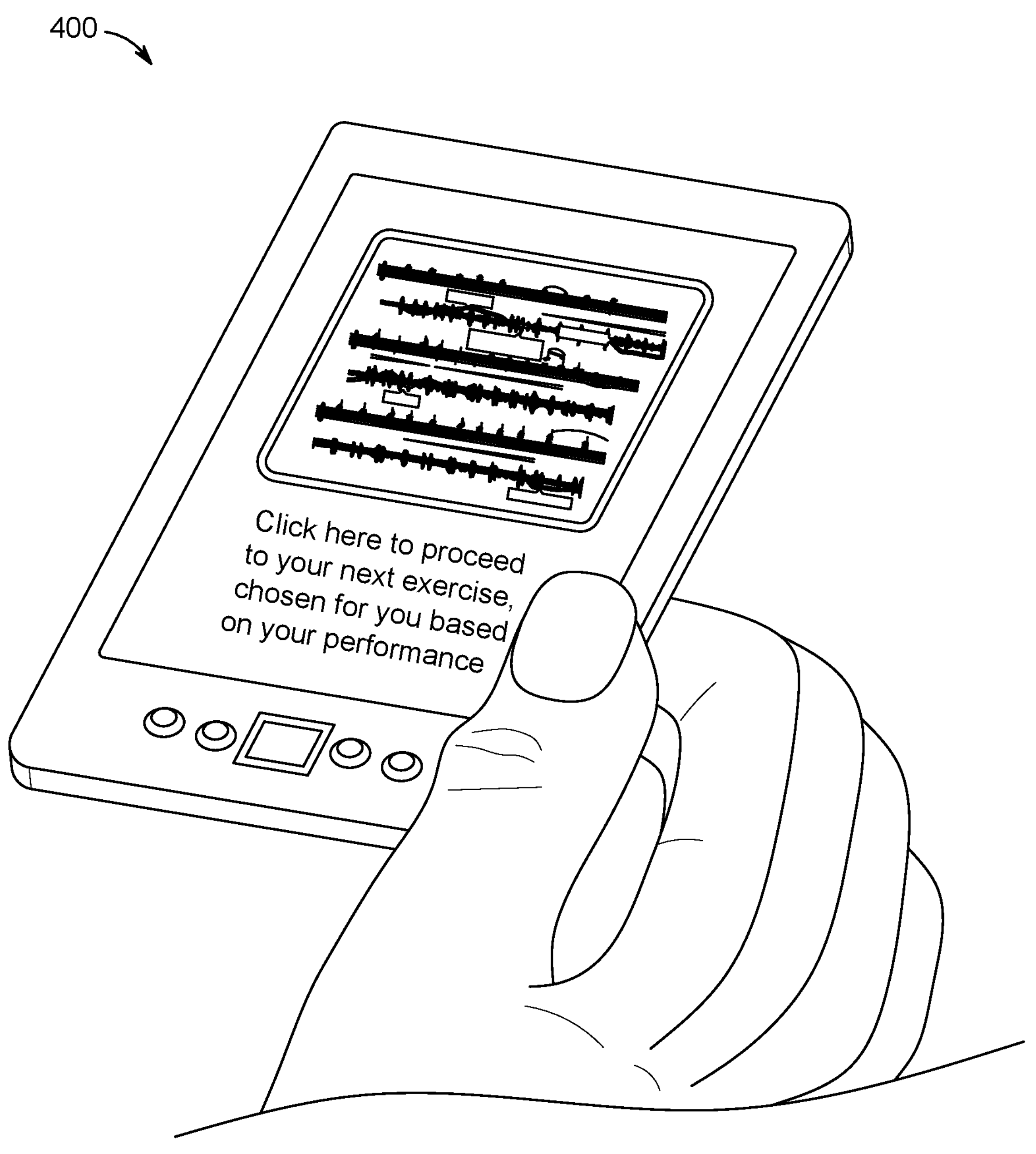
FIG. 4 is an illustration of e-book reader displaying an e-book with GUI showing an automated assessment of a user performance of a first musical piece, along with a text prompt to display subsequent content based on an automatically-determined measure of proficiency based on the user performance of the first musical piece, according to an illustrative embodiment.

FIG. 4 is an illustration of an e-book reader 400 displaying an e-book with GUI showing an automated assessment of a user performance of a first musical piece, along with a text prompt to display subsequent content based on an automatically-determined measure of proficiency based on the user performance of the first musical piece, according to an illustrative embodiment. In this example, the e-book reader is a portable electronic device designed primarily for the purpose of presenting/displaying digital e-books, for example, a device as described in U.S. Pat. No. 10,007,402, 'System and method for displaying content," issued Jun. 26, 2018, and incorporated herein by reference in its entirety. The GUI depicted in FIG. 4 indicates the user is reader to proceed to the next page, chapter, or musical piece, which is automatically determined based at least in part on user performance of the preceding musical piece as evaluated by the system. The user may then click on the presented GUI object (e.g., a link) or otherwise "turn the page" of the e-book to proceed to the next page, chapter, or musical piece.

Software, Computer System, and Network Environment

Certain embodiments described herein make use of computer algorithms in the form of software instructions executed by a computer processor. In certain embodiments, the software instructions include a machine learning module, also referred to herein as artificial intelligence software. As used herein, a machine learning module refers to a computer implemented process (e.g., a software function) that implements one or more specific machine learning algorithms, such as, for example, an artificial neural network (ANN), a convolutional neural network (CNN), random forest, decision trees, support vector machines, and the like, in order to determine, for a given input, one or more output values. In certain embodiments, the input comprises alphanumeric data which can include numbers, words, phrases, or lengthier strings, for example. In certain embodiments, the one or more output values comprise values representing numeric values, words, phrases, or other alphanumeric strings. In certain embodiments, the one or more output values comprise an identification of one or more response strings (e.g., selected from a database).

For example, a machine learning module may receive as input a textual string (e.g., entered by a human user, for example) and generate various outputs. For example, the machine learning module may automatically analyze the input alphanumeric string(s) to determine output values classifying a content of the text (e.g., an intent), e.g., as in natural language understanding (NLU). In certain embodiments, a textual string is analyzed to generate and/or retrieve an output alphanumeric string. For example, a machine learning module may be (or include) natural language processing (NLP) software.

In certain embodiments, machine learning modules implementing machine learning techniques are trained, for example using datasets that include categories of data described herein. Such training may be used to determine various parameters of machine learning algorithms implemented by a machine learning module, such as weights associated with layers in neural networks. In certain embodiments, once a machine learning module is trained, e.g., to accomplish a specific task such as identifying certain response strings, values of determined parameters are fixed and the (e.g., unchanging, static) machine learning module is used to process new data (e.g., different from the training data) and accomplish its trained task without further updates to its parameters (e.g., the machine learning module does not receive feedback and/or updates). In certain embodiments, machine learning modules may receive feedback, e.g., based on user review of accuracy, and such feedback may be used as additional training data, to dynamically update the machine learning module. In certain embodiments, two or more machine learning modules may be combined and implemented as a single module and/or a single software application. In certain embodiments, two or more machine learning modules may also be implemented separately, e.g., as separate software applications. A machine learning module may be software and/or hardware. For example, a machine learning module may be implemented entirely as software, or certain functions of a ANN module (e.g., CNN) may be carried out via specialized hardware (e.g., via an application specific integrated circuit (ASIC)).

Among other things, as described herein, machine learning modules used in accordance with systems and methods of the present disclosure may automatically identify content to be provided (e.g., displayed) to the user. Such content may, for example, include particular variants and/or portions thereof, such as particular musical pieces and/or explanatory content, such as text/video/audio explanations of various skills, musical features, and the like. As described herein, machine learning modules can identify content based at least in part measures of proficiency determined for a particular user, as they interact with their e-book.

In certain embodiments, a machine learning module may be used to select particular content or types of content from a database of stored content components, such as musical pieces and explanatory content. Machine learning techniques may utilize inputs such as particular performance errors of a user, user preferred learning styles, historical user data, etc. to match content to the particular problem area a user is experiencing, skills they are trying to develop, and/or preferred learning style. Machine learning techniques, may, for example, do so by performing classification to assign one or more labels to the user's performance and/or to pieces of content, allowing them to be matched.

Figure 5:
FIG. 5 is a block flow diagram of an illustrative method for generating content for automatically generating tailored content elements customized to an individual user of an interactive electronic book, according to an illustrative embodiment.
Figure 5:
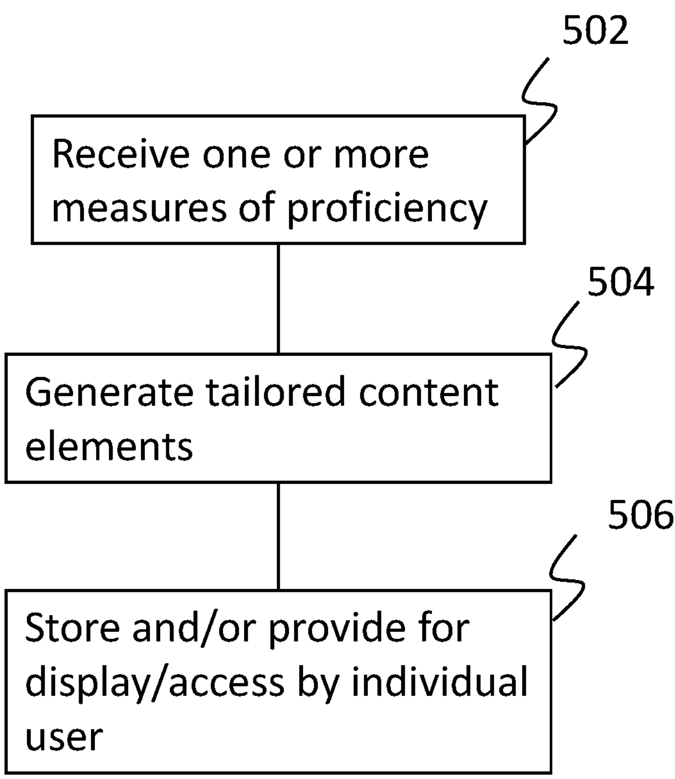

In certain embodiments, machine learning modules may be generative models (e.g., as opposed to classifier models)

and may identify content by generating new musical pieces and/or explanatory content. For example, turning to FIG. 5, in certain embodiments, as systems and methods described herein evaluate errors a user has made in their performance, e.g., in pitch, rhythm, and/or temp, this data may be received 502 and used as input to a generative machine learning model to create additional content, such as tailored practice pieces, isolating specific problem area and/or tailored explanatory content 504.

For example, machine learning modules may generate new musical content using text-based notation systems, such as ABC notation or other (e.g., proprietary) notation systems that allow musical pieces to be represented via text and, accordingly, evaluated and interpreted by software. In certain embodiments, machine learning modules may, accordingly, utilize language modules (LMs) utilizing recurrent and/or attention-based (e.g., transformer) architectures that are trained on corpuses of musical pieces encoded via text-based notation systems (e.g., analogously to written language LLMs, such as BERT, GTP, and the like).

In certain embodiments, machine learning modules may generate explanatory content using written language (e.g., English, Spanish, French, Chinese, etc.) LMs, such as BERT, GTP (e.g., ChatGTP), and the like. For example, as systems and methods described herein evaluate user performance and identify areas of weakness, they may call a machine learning module to generate (e.g., multiple) alternative explanations of particular content areas (e.g., skills, musical concepts, etc.) in question. Among other things, alternative explanations may be generated based on or to reflect different styles of explanation, such as formal, informal, technical, etc. and may, in certain embodiments, account for user preferences of particular explanation styles, which may be directly input by the user (e.g., in settings of the e-book/their profile) and/or learned by the machine learning model, for example based on historical user data.

As described herein, machine learning modules may be trained using corpuses of data (e.g., musical pieces and/or text data) obtained from public and/or private sources, and/or may, additionally or alternatively, be trained using data obtained by other users of e-book systems described herein. In certain embodiments, for example, machine learning modules may be periodically (e.g., at regular intervals) updated (e.g., re-trained or fine-tuned) as additional data is received, allowing them to be continually refined as a community of users interact with and learn using e-book systems of the present disclosure.

Machine learning modules may, accordingly, generate (e.g., automatically, e.g., on-the-fly) content, such as musical content and/or explanatory content, which can then be (e.g., automatically) uploaded into a platform and stored, e.g., for download by a user, and/or provided (e.g., transmitted as a content update, push notification, etc., to a user's electronic book) 506. Automated generation and updating of contents of a user's electronic book may be performed on a processor of the user's electronic book, or may be facilitated via a cloud-based platform.

Figure 6:
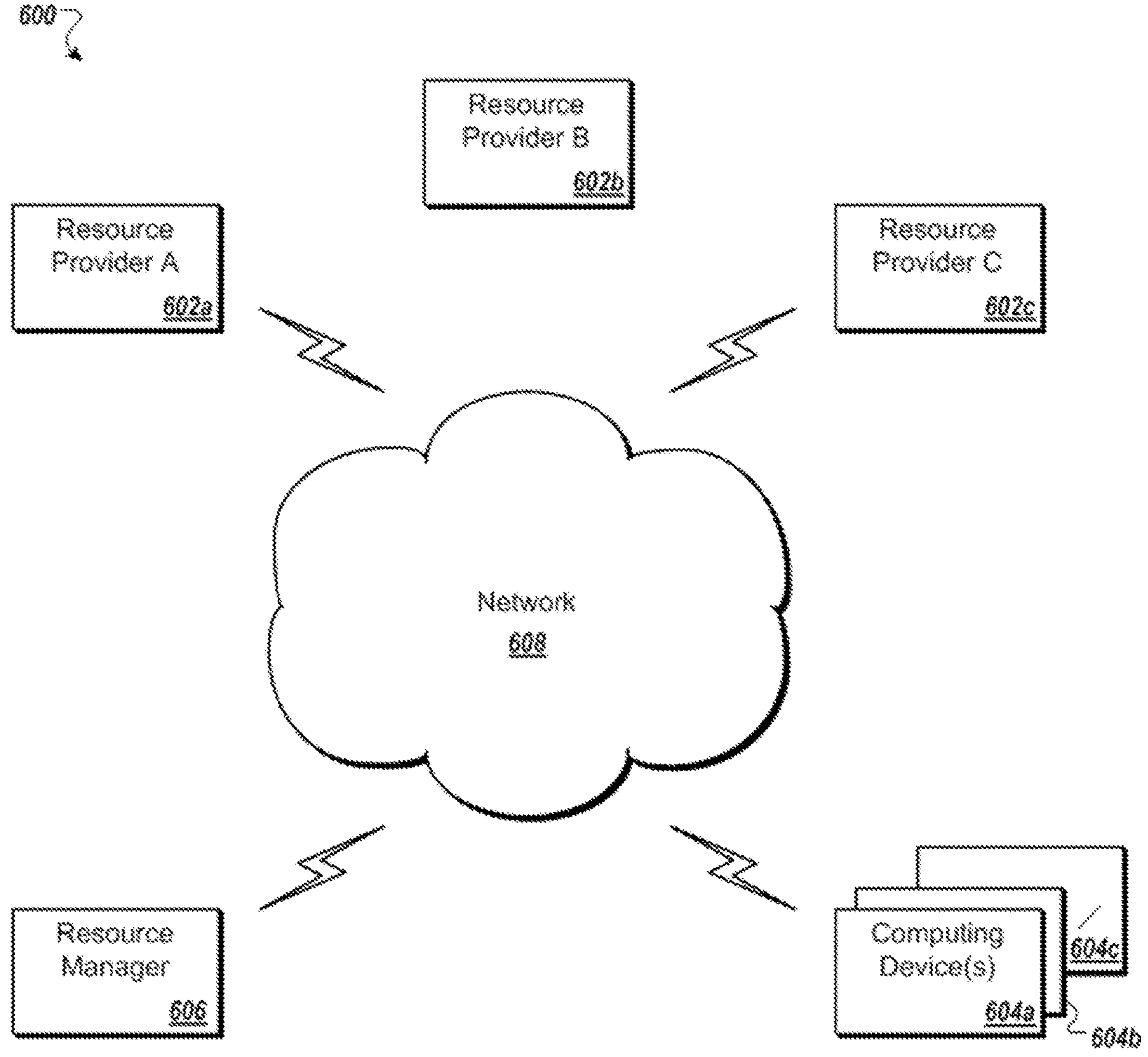
FIG. 6 is a schematic diagram of a network environment for use in providing the systems and methods described herein.

As shown in FIG. 6, an implementation of a network environment 600 for use in providing systems, methods, and architectures as described herein is shown and described. In brief overview, referring now to FIG. 6, a block diagram of an exemplary cloud computing environment 600 is shown and described. The cloud computing environment 600 may include one or more resource providers 602*a*, 602*b*, 602*c* (collectively, 602). Each resource provider 602 may include computing resources. In some implementations, computing resources may include any hardware and/or software used to process data. For example, computing resources may include hardware and/or software capable of executing algorithms, computer programs, and/or computer applications. In some implementations, exemplary computing resources may include application servers and/or databases with storage and retrieval capabilities. Each resource provider 602 may be connected to any other resource provider 602 in the cloud computing environment 600. In some implementations, the resource providers 602 may be connected over a computer network 608. Each resource provider 602 may be connected to one or more computing device 604*a*, 604*b*, 604*c* (collectively, 604), over the computer network 608.

The cloud computing environment 600 may include a resource manager 606. The resource manager 606 may be connected to the resource providers 602 and the computing devices 604 over the computer network 608. In some implementations, the resource manager 606 may facilitate the provision of computing resources by one or more resource providers 602 to one or more computing devices 604. The resource manager 606 may receive a request for a computing resource from a particular computing device 604. The resource manager 606 may identify one or more resource providers 602 capable of providing the computing resource requested by the computing device 604. The resource manager 606 may select a resource provider 602 to provide the computing resource. The resource manager 606 may facilitate a connection between the resource provider 602 and a particular computing device 604. In some implementations, the resource manager 606 may establish a connection between a particular resource provider 602 and a particular computing device 604. In some implementations, the resource manager 606 may redirect a particular computing device 604 to a particular resource provider 602 with the requested computing resource.

Figure 7:
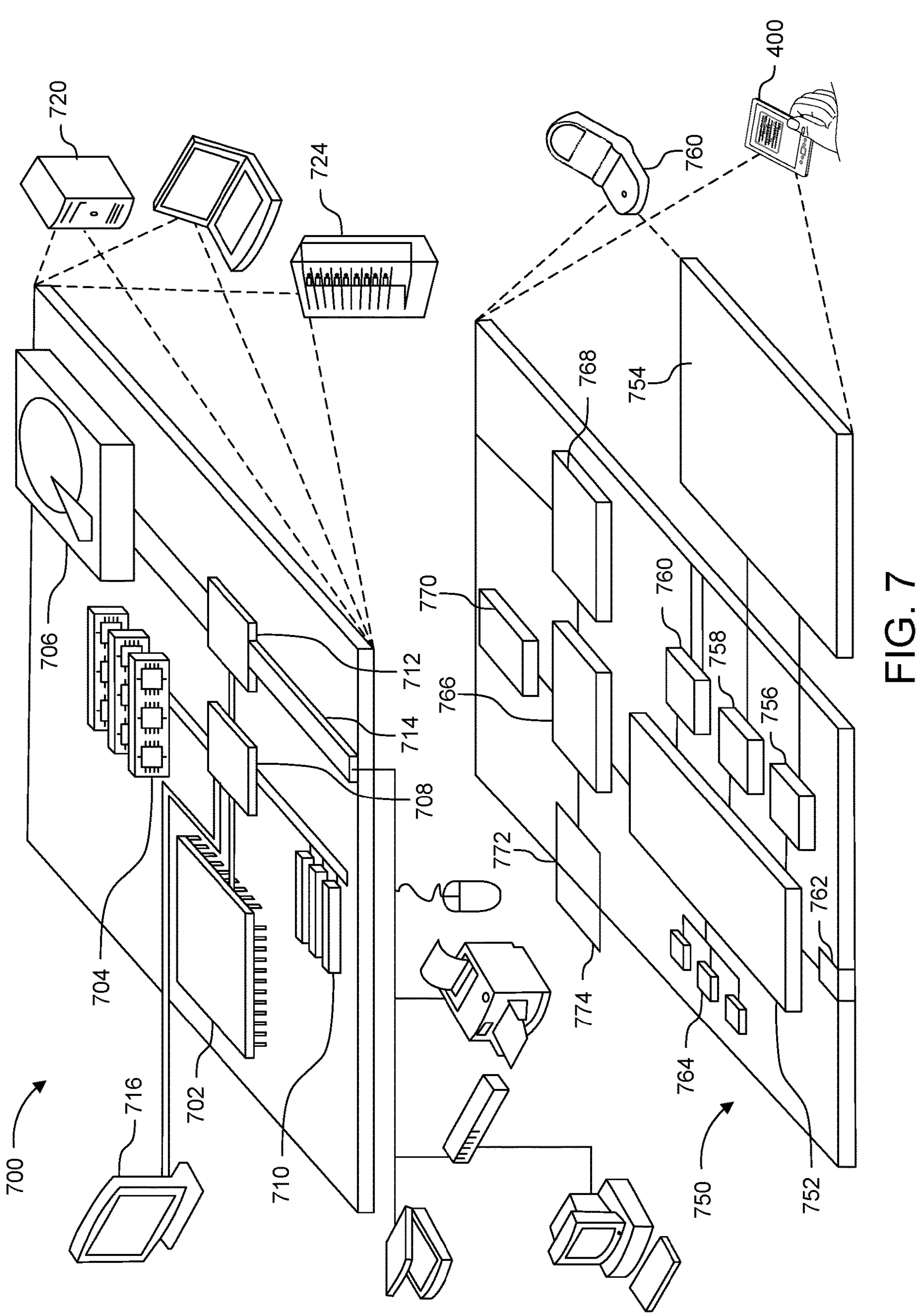
FIG. 7 is a schematic diagram depicting a computing device and a mobile computing device that can be used to implement the systems and methods described herein.

FIG. 7 shows an example of a computing device 700 and a mobile computing device 750 that can be used to implement the techniques described in this disclosure. The computing device 700 is intended to represent various forms of digital computers, such as laptops, desktops, workstations, personal digital assistants, servers, blade servers, mainframes, and other appropriate computers. The mobile computing device 750 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 700 includes a processor 702, a memory 704, a storage device 706, a high-speed interface 708 connecting to the memory 704 and multiple high-speed expansion ports 710, and a low-speed interface 712 connecting to a low-speed expansion port 714 and the storage device 706. Each of the processor 702, the memory 704, the storage device 706, the high-speed interface 708, the high-speed expansion ports 710, and the low-speed interface 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as a display 716 coupled to the high-speed interface 708. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system). Thus, as the term is used herein, where a plurality of functions are described as being performed by "a processor", this encompasses embodiments wherein the plurality of functions are performed by any number of processors (one or more) of any number of computing devices (one or more). Furthermore, where a function is described as being performed by "a processor", this encompasses embodiments wherein the function is performed by any number of processors (one or more) of any number of computing devices (one or more) (e.g., in a distributed computing system).

The memory 704 stores information within the computing device 700. In some implementations, the memory 704 is a volatile memory unit or units. In some implementations, the memory 704 is a non-volatile memory unit or units. The memory 704 may also be another form of computer-readable medium, such as a magnetic or optical disk.

The storage device 706 is capable of providing mass storage for the computing device 700. In some implementations, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 702), perform one or more methods, such as those described above. The instructions can also be stored by one or more storage devices such as computer- or machine-readable mediums (for example, the memory 704, the storage device 706, or memory on the processor 702).

The high-speed interface 708 manages bandwidth-intensive operations for the computing device 700, while the low-speed interface 712 manages lower bandwidth-intensive operations. Such allocation of functions is an example only. In some implementations, the high-speed interface 708 is coupled to the memory 704, the display 716 (e.g., through a graphics processor or accelerator), and to the high-speed expansion ports 710, which may accept various expansion cards (not shown). In the implementation, the low-speed interface 712 is coupled to the storage device 706 and the low-speed expansion port 714. The low-speed expansion port 714, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. In addition, it may be implemented in a personal computer such as a laptop computer 722. It may also be implemented as part of a rack server system 724. Alternatively, components from the computing device 700 may be combined with other components in a mobile device (not shown), such as a mobile computing device 750. Each of such devices may contain one or more of the computing device 700 and the mobile computing device 750, and an entire system may be made up of multiple computing devices communicating with each other.

The mobile computing device 750 includes a processor 752, a memory 764, an input/output device such as a display 754, a communication interface 766, and a transceiver 768, among other components. The mobile computing device 750 may also be provided with a storage device, such as a micro-drive or other device, to provide additional storage. Each of the processor 752, the memory 764, the display 754, the communication interface 766, and the transceiver 768, are interconnected using various buses, and several of the components may be mounted on a common motherboard or in other manners as appropriate.

The processor 752 can execute instructions within the mobile computing device 750, including instructions stored in the memory 764. The processor 752 may be implemented as a chipset of chips that include separate and multiple analog and digital processors. The processor 752 may provide, for example, for coordination of the other components of the mobile computing device 750, such as control of user interfaces, applications run by the mobile computing device 750, and wireless communication by the mobile computing device 750.

The processor 752 may communicate with a user through a control interface 758 and a display interface 756 coupled to the display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may provide communication with the processor 752, so as to enable near area communication of the mobile computing device 750 with other devices. The external interface 762 may provide, for example, for wired communication in some implementations, or for wireless communication in other implementations, and multiple interfaces may also be used.

The memory 764 stores information within the mobile computing device 750. The memory 764 can be implemented as one or more of a computer-readable medium or media, a volatile memory unit or units, or a non-volatile memory unit or units. An expansion memory 774 may also be provided and connected to the mobile computing device 750 through an expansion interface 772, which may include, for example, a SIMM (Single In Line Memory Module) card interface. The expansion memory 774 may provide extra storage space for the mobile computing device 750, or may also store applications or other information for the mobile computing device 750. Specifically, the expansion memory 774 may include instructions to carry out or supplement the processes described above, and may include secure information also. Thus, for example, the expansion memory 774 may be provide as a security module for the mobile computing device 750, and may be programmed with instructions that permit secure use of the mobile computing device 750. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. The instructions, when executed by one or more processing devices (for example, processor 752), perform one or more methods, such as those described above. The instructions can also be stored by one or more storage devices, such as one or more computer- or machine-readable mediums (for example, the memory 764, the expansion memory 774, or memory on the processor 752). In some implementations, the instructions can be received in a propagated signal, for example, over the transceiver 768 or the external interface 762.

The mobile computing device 750 may communicate wirelessly through the communication interface 766, which may include digital signal processing circuitry where necessary. The communication interface 766 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 768 using a radio-frequency. In addition, short-range communication may occur, such as using a Bluetooth®, Wi-Fi™, or other such transceiver (not shown). In addition, a GPS (Global Positioning System) receiver module 770 may provide additional navigation- and location-related wireless data to the mobile computing device 750, which may be used as appropriate by applications running on the mobile computing device 750.

The mobile computing device 750 may also communicate audibly using an audio codec 760, which may receive spoken information from a user and convert it to usable digital information. The audio codec 760 may likewise generate audible sound for a user, such as through a speaker, e.g., in a handset of the mobile computing device 750. Such sound may include sound from voice telephone calls, may include recorded sound (e.g., voice messages, music files, etc.) and may also include sound generated by applications operating on the mobile computing device 750.

The mobile computing device 750 may be implemented in a number of different forms, as shown in the figure. For example, it may be implemented as a cellular telephone 780. It may also be implemented as part of a smart-phone, personal digital assistant, or other similar mobile device.

In certain embodiments, the mobile computing device 750 is an electronic book (e-book) reader 400. In certain embodiments, an e-book reader is a smartphone, a portable computer, a desktop computer, or other computing device with a display and/or audio feedback. In certain embodiments, the e-book reader is capable of detecting an audio signal and transmitting the audio signal to a processor for processing (e.g., where the processing software is executed by a processor remote from the e-book reader). In certain embodiments, the e-book reader is capable of detecting an audio signal and executing software on a processor that is part of the e-book reader device. In certain embodiments, an e-book reader is wireless. In certain embodiments, an e-book reader includes one or more ports for connection to other devices, e.g., for connection of one or more cables, e.g., for direct input of a signal from an electronic instrument (e.g., electric guitar or electric keyboard) and/or for direct output to a processor and/or other device(s). In certain embodiments, the software for processing the digital signal received by the e-book reader is designed to operate without cables, e.g., the reader detects vocal signals and/or non-digital instrumental signals, and/or the software can work with a wide range of signal quality and/or under a variety of real-world conditions (e.g., filtering out background sounds). In certain embodiments, feedback is rendered for display to the user via the e-book reader, said feedback determined by matching the detected audio output of the user in comparison to a digital reference file. In certain embodiments where a user is playing a MIDI instrument, such as a keyboard with MIDI output, the sound produced by the instrument is detected and compared to a reference file. In other embodiments where a user is playing a MIDI instrument, the MIDI data is compared to the reference file for providing feedback.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In some implementations, certain modules described herein can be separated, combined or incorporated into single or combined modules. Any modules depicted in the figures are not intended to limit the systems described herein to the software architectures shown therein.

Elements of different implementations described herein may be combined to form other implementations not specifically set forth above. Elements may be left out of the processes, computer programs, databases, etc. described herein without adversely affecting their operation. In addition, the logic flows depicted in the figures do not require the particular order shown, or sequential order, to achieve desirable results. Various separate elements may be combined into one or more individual elements to perform the functions described herein.

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A method for automatically providing one or more tailored content elements customized to an individual user of an interactive electronic book, the method comprising:

(a) receiving, by a processor of a computing device, one or more audio signals, each corresponding to a performance of the individual user on a particular musical piece of one or more musical pieces, wherein the interactive electronic book comprises a plurality of chapters in which content is delivered to the user via a combination of media types, wherein the plurality of chapters comprises the one or more musical pieces;

(b) determining, by the processor, one or more measures of proficiency evaluating performance of the individual user on the one or more musical pieces, said determining comprising, for at least a first audio signal of the one or more audio signals:

automatically identifying, by the processor, one or more musical features from the first audio signal, said one or more musical features selected from the group consisting of (i), (ii), and (iii) as follows: (i) a sequence of pitches, (ii) a rhythm, and (iii) a tempo;

automatically determining, by the processor, where the identified one or more musical features agree with and/or deviate from corresponding reference features of a first musical piece of the one or more musical pieces, wherein the first audio signal corresponds to a first performance of the individual user on the first musical piece; and determining, by the processor, a first measure of proficiency of the one or more measures of proficiency based at least in part on the determined agreement with and/or deviation from the reference features of the first musical piece;

(c) automatically identifying, by the processor, using one or more machine learning module(s), a specific media type of the combination of media types as a preferred learning style of the user based on the one or more measures of proficiency;

(d) automatically identifying, by the processor, the one or more tailored content elements based on the preferred learning style of the user, wherein the one or more tailored content elements comprises one or more new musical pieces and/or explanatory content; and (e) storing and/or providing, by the processor, the one or more tailored content elements for display to and/or access by the individual user.

2. The method of claim 1, wherein the computing device is a server of a cloud-based system.

3. The method of claim 1, wherein the one or more tailored content elements comprise a generated musical piece.

4. The method of claim 3, wherein step (d) comprises using a first generative machine learning module that receives, as input, at least a portion of the one or more measures of proficiency, and generates, as output, a musical notation string comprising a plurality of characters representing the generated musical piece.

5. The method of claim 1, wherein the one or more tailored content elements comprise a generated explanatory content element.

6. The method of claim 5, wherein step (d) comprises using a second generative machine learning module that receives, as input, at least a portion of the one or more measures of proficiency, and generates, as output, one or more text strings, each providing a human language explanation of a particular content area.

7. The method of claim 1, wherein the one or more tailored content elements are associated with a second subset of the plurality of chapters of the interactive electronic book.

8. The method of claim 1, wherein the combination of media types comprises two or more members selected from the group consisting of text, audio, and video.

9. The method of claim 1, wherein the specific media type identified as the preferred learning style of the user is a member selected from the group consisting of text, audio, and video.

10. The method of claim 1, wherein the one or more tailored content elements comprise a generated explanatory content element in a media type selected to match the preferred learning style of the user.

11. The method of claim 1, wherein step (d) comprises selecting the one or more tailored content elements from a database of stored content components to match the preferred learning style of the user.

12. The method of claim 1, wherein the one or more musical features comprise (i) a sequence of pitches and (ii) a rhythm and/or a tempo.

13. The method of claim 4, wherein the first generative machine learning module comprises a language model (LM).

14. The method of claim 6, wherein the second generative machine learning module comprises a language model (LM).

15. A system for automatically providing one or more tailored content elements customized to an individual user of an interactive electronic book, the system comprising:

a processor of a computing device; and memory having instructions stored thereon, wherein the instructions, when executed by the processor, cause the processor to:

(a) receive one or more audio signals, each corresponding to a performance of the individual user on a particular musical piece of one or more musical pieces, wherein the interactive electronic book comprising a plurality of chapters in which content is delivered to the user via a combination of media types, wherein the plurality of chapters comprises the one or more musical pieces;

(b) determine one or more measures of proficiency evaluating performance of the individual user on the one or more musical pieces, said determining comprising, for at least a first audio signal of the one or more audio signals:

automatically identifying one or more musical features from the first audio signal, said one or more musical features selected from the group consisting of (i), (ii), and (iii) as follows: (i) a sequence of pitches, (ii) a rhythm, and (iii) a tempo;

automatically determining where the identified one or more musical features agree with and/or deviate from corresponding reference features of a first musical piece of the one or more musical pieces, wherein the first audio signal corresponds to a first performance of the individual user on the first musical piece; and determining a first measure of proficiency of the one or more measures of proficiency based at least in part on the determined agreement with and/or deviation from the reference features of the first musical piece;

(c) automatically identify, using one or more machine learning module(s), a specific media type of the combination of media types as a preferred learning style of the user based on the one or more measures of proficiency;

(d) automatically identify the one or more tailored content elements based on the preferred learning style of the user, wherein the one or more tailored content elements comprises one or more new musical pieces and/or explanatory content; and (e) store and/or provide the one or more tailored content elements for display to and/or access by the individual user.

16. The system of claim 15, wherein the system is a cloud-based system.

17. The system of claim 15, wherein the one or more tailored content elements comprise a generated musical piece.

18. The system of claim 17, wherein at step (d), the instructions cause the processor to use a first generative machine learning module that receives, as input, at least a portion of the one or more measures of proficiency, and generates, as output, a musical notation string comprising a plurality of characters representing the generated musical piece.

19. The system of claim 15, wherein the one or more tailored content elements comprise a generated explanatory content element.

20. The system of claim 19, wherein at step (d), the instructions cause the processor to use a second generative machine learning module that receives, as input, at least a portion of the one or more measures of proficiency, and generates, as output, one or more text strings, each providing a human language explanation of a particular content area.

* * * * *